(12) United States Patent
Francis

(10) Patent No.: US 11,098,835 B2
(45) Date of Patent: Aug. 24, 2021

(54) SEAL SYSTEM AND METHOD

(71) Applicant: Trinity Bay Equipment Holdings, LLC, Houston, TX (US)

(72) Inventor: Kirk Spencer Francis, Richmond, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/145,102

(22) Filed: Jan. 8, 2021

(65) Prior Publication Data

US 2021/0231255 A1 Jul. 29, 2021

Related U.S. Application Data

(60) Provisional application No. 62/965,386, filed on Jan. 24, 2020.

(51) Int. Cl.
*F16L 55/163* (2006.01)
*F16L 55/18* (2006.01)

(52) U.S. Cl.
CPC ............. *F16L 55/163* (2013.01); *F16L 55/18* (2013.01)

(58) Field of Classification Search
CPC ... F16L 55/162; F16L 55/165; F16L 55/1652; F16L 55/1653; F16L 55/26; B64C 39/024; G01M 3/04; G05D 1/0011
USPC .............. 138/97, 98, 93; 156/294, 156, 287; 405/150.1, 148.1, 184.2, 303; 264/516, 264/269; 73/40.5 R; 702/51
See application file for complete search history.

(56) References Cited

U.S. PATENT DOCUMENTS

| | | | | |
|---|---|---|---|---|
| 4,995,761 A * | 2/1991 | Barton | ................... | F16L 55/163 138/93 |
| 5,368,075 A * | 11/1994 | Baro | ..................... | F16L 55/163 138/98 |
| 5,983,948 A * | 11/1999 | Yagi | ....................... | F16L 55/164 138/97 |
| 6,857,451 B1 * | 2/2005 | Connor | ................. | B29C 63/343 138/98 |
| 8,235,075 B2 | 8/2012 | Saltel | | |
| 8,620,602 B2 * | 12/2013 | Alonso | ..................... | F17D 5/06 702/52 |
| 8,850,871 B2 * | 10/2014 | Schaefer | ............. | G01M 3/2807 73/40.5 A |
| 9,163,487 B2 | 10/2015 | Leighton et al. | | |
| 9,261,218 B2 * | 2/2016 | Cheatham, III | .... | F16L 55/1645 |
| 9,347,212 B2 * | 5/2016 | Bichler | ..................... | E03F 7/12 |

(Continued)

OTHER PUBLICATIONS

International Search Report / Written Opinion dated May 20, 2021 for PCT/US2021014797 filed Jan. 22, 2021.

*Primary Examiner* — Patrick F Brinson
(74) *Attorney, Agent, or Firm* — Fletcher Yoder, P.C.; Matthew G. Osterhaus

(57) ABSTRACT

A seal system for sealing a hole in a conduit. The seal system includes an expandable seal that transitions from a contracted state to an expanded state. In the expanded state the expandable seal contacts an interior surface of the conduit around a hole. An expander is inserted into the expandable seal to transition the expandable seal from the contracted state to the expanded state. A sensor emits a first signal indicative of the hole in the conduit. A controller couples to the sensor and detects a location of the hole in response to the first signal emitted by the sensor.

19 Claims, 8 Drawing Sheets

(56) References Cited

U.S. PATENT DOCUMENTS

| | | | |
|---|---|---|---|
| 10,309,574 B2* | 6/2019 | Finodeyev | G01M 3/243 |
| 10,428,615 B2 | 10/2019 | Saltel et al. | |
| 2002/0083990 A1* | 7/2002 | Lundman | F16L 55/1645 |
| | | | 138/98 |
| 2004/0089358 A1* | 5/2004 | Burd | F16L 55/179 |
| | | | 138/98 |
| 2012/0067564 A1 | 3/2012 | Mack et al. | |
| 2014/0090857 A1 | 4/2014 | Fripp et al. | |
| 2014/0261833 A1* | 9/2014 | Kiest, Jr. | E02D 29/128 |
| | | | 138/98 |
| 2015/0034198 A1 | 2/2015 | Cheatham, III et al. | |
| 2019/0137028 A1* | 5/2019 | Robinson | F16L 55/163 |

* cited by examiner

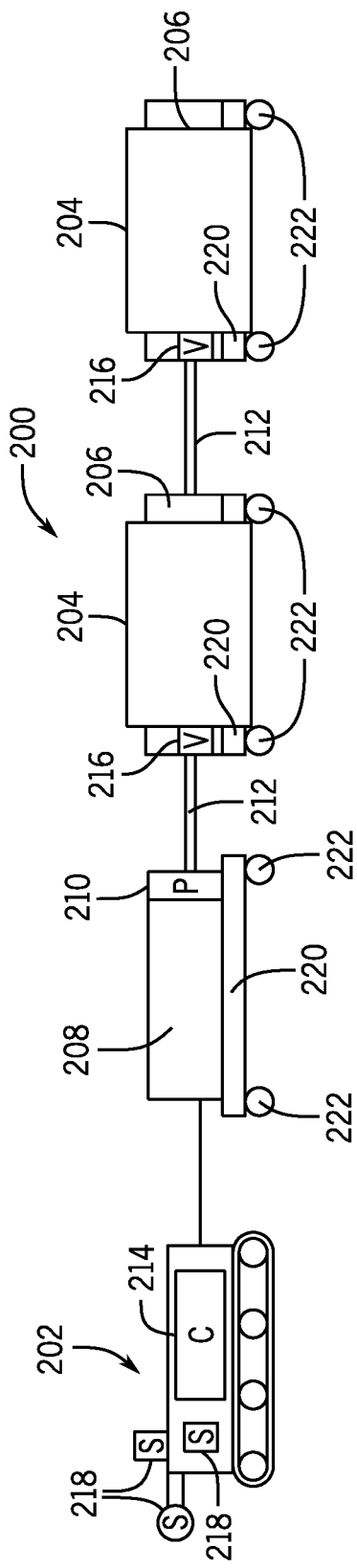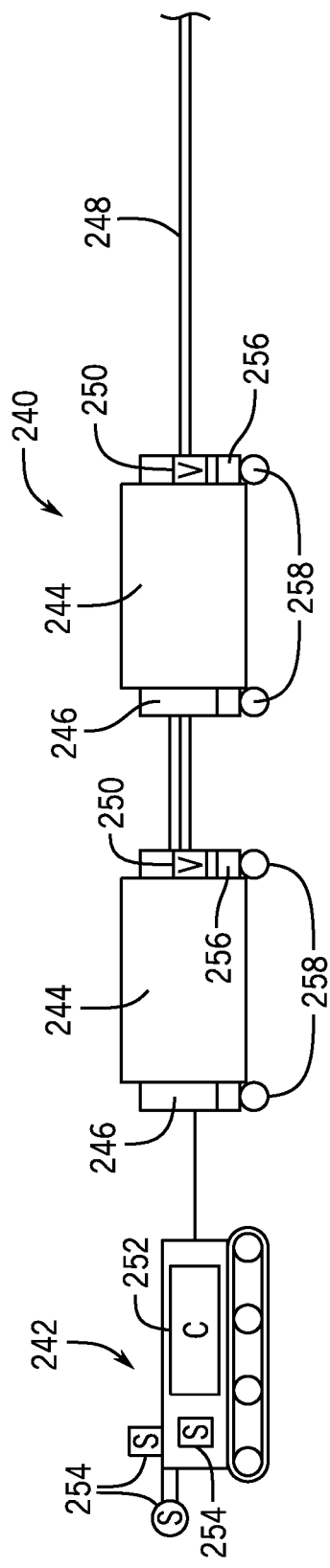

SEAL SYSTEM AND METHOD

CROSS-REFERENCE TO RELATED APPLICATIONS

The present disclosure is a non-provisional patent application, which claims the benefit of and priority to U.S. Provisional Patent Application No. 62/965,386, entitled "SEAL SYSTEM AND METHOD" and filed on Jan. 24, 2020, which is incorporated herein by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

In some places, pipeline operators could experience fuel theft through illegal tapping of their pipelines. Thieves may steal the fuel by digging to reach a buried pipeline and then drilling a hole in the pipe. The release of fuel through the hole may be collected with hoses and buckets for use by the thieves or sold on the black market. These illegal taps may result in fuel loss and spillage that damages the environment, and may affect the structural integrity of the pipelines.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Instead of digging up a pipeline or digging new trenches to install new pipeline, flexible pipe may be installed into existing pipeline infrastructure. Indeed, flexible pipe is durable and operational in harsh operating conditions and can accommodate high pressures and temperatures. In the event that the flexible pipe is tapped or damaged, the holes in the flexible pipe can be repaired even if the flexible pipe is installed in other pipeline infrastructure.

In one example, a seal system for sealing a hole in a conduit. The seal system includes an expandable seal that transitions from a contracted state to an expanded state. In the expanded state the expandable seal contacts an interior surface of the conduit around a hole. An expander is inserted into the expandable seal to transition the expandable seal from the contracted state to the expanded state. A sensor emits a first signal indicative of the hole in the conduit. A controller couples to the sensor and detects a location of the hole in response to the first signal emitted by the sensor.

In another example, a method of repairing a hole in a flexible pipe. The method includes detecting a location of a hole in a flexible pipe. The method also includes moving an expandable seal through a bore of the flexible pipe to align the expandable seal with the hole. The method then expands the expandable seal with an expander to form a seal around the hole in the flexible pipe.

In another example, a seal system for sealing a hole in a conduit. The seal system includes an expandable seal that transitions from a contracted state to an expanded state. In the expanded state the expandable seal contacts an interior surface of a conduit around a hole. The expandable seal includes a first layer of material. A second layer of material couples to an exterior surface of the first layer. The second layer forms a seal with the conduit around the hole. The expandable seal includes only a single continuous portion of the second layer of material.

Other aspects and advantages of the claimed subject matter will be apparent from the following description and the appended claims.

BRIEF DESCRIPTION OF THE DRAWINGS

FIG. 8 is a side view of a seal system, according to embodiments of the present disclosure.

FIG. 9 is a side view of a seal system, according to embodiments of the present disclosure.

DETAILED DESCRIPTION

Figure 1:
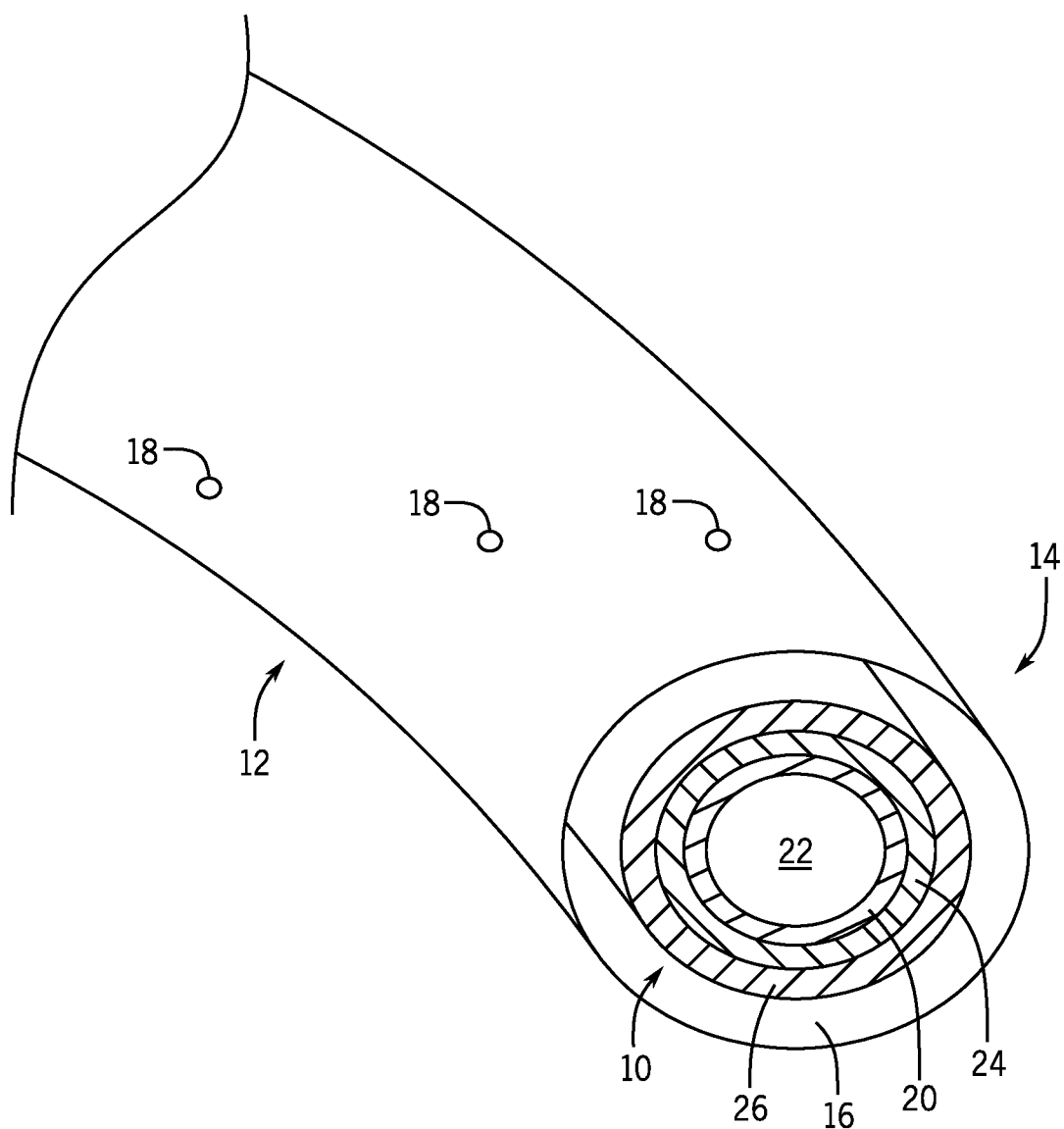
FIG. 1 is a perspective cross-sectional view of a flexible pipe installed within a carrier pipe, according to embodiments of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

As explained above, pipeline operators may experience fuel theft through illegal tapping of their pipelines. These illegal taps result in fuel loss and spillage that damages the environment, and may affect the structural integrity of the pipelines. However, instead of digging up the existing pipeline or digging new trenches to install new pipeline, flexible pipe may be installed inside the existing pipeline. The existing pipeline then becomes a carrier pipe that provides a conduit for the rapid deployment of the flexible pipe. This disclosure describes systems and methods that may allow the flexible pipe to be repaired in the event that a hole is drilled into the flexible pipe. The repair systems and methods of this disclosure are provided despite challenges from the structure of the flexible pipe that may limit the types of repairs that may be performed. As will be explained below, flexible pipe may include multiple layers of thermoplastic (e.g., high density polyethylene) that encase one or more layers of metal strips (e.g., steel). Accordingly, patching an illegal tap presents the challenge of sealing a hole through multiple layers of different materials. The disclosure below describes a seal system and method that enables the repair of flexible pipe, including when the flexible pipe is disposed within an existing carrier pipe.

FIG. 1 is a perspective cross-sectional view of a flexible pipe 10 (e.g., conduit) installed within a carrier pipe 12 (e.g., conduit) to form a pipeline infrastructure or pipe system 14. The carrier pipe 12 defines a bore 16 that receives the flexible pipe 10 during installation. Placing flexible pipe 10 within an existing pipe may save time and money by reducing and/or eliminating the construction of trenches and/or other infrastructure for laying the flexible pipe 10.

In some situations, the carrier pipe 12 may already be buried below the surface. If a hole is drilled into the flexible pipe 10, multiple layers of the flexible pipe 10 may be impacted. For example, the flexible pipe 10 may include a first or inner layer 20 that may be made from a thermoplastic (e.g., high density polyethylene (HDPE)). The inner layer 20 defines a bore 22 that carries a fluid (e.g., fuel). Surrounding the inner layer 20 is a second or middle layer 24 that may be made from a metal(s) (e.g., steel strips) that provides strength to the flexible pipe 10. And surrounding the middle layer 24 may be a third or outer layer 26 made from a thermoplastic (e.g., HDPE). The inner layer 20 and the outer layer 26 may protect the middle layer 24 from fluids within the bore 22 as well as from fluids and substances outside of the flexible pipe 10. For example, the inner layer 20 and the outer layer 26 may protect the middle layer 24 from corrosion.

It should be understood that flexible pipe 10 is a tube or conduit that conveys or transfers any water, gas, oil, or any type of suitable fluid. The flexible pipe 10 may be made of any type of materials including plastics, metals, composites (e.g., fiber-reinforced composites), and/or other suitable materials. The flexible pipe 10 may include Bonded or Unbonded Flexible Pipe, Flexible Composite Pipe (FCP), Thermoplastic Composite Pipe (TCP) or Reinforced Thermoplastic Pipe (RTP). FCP or RTP pipe may itself be generally composed of several layers. In one or more embodiments, a flexible pipe may include a thermoplastic liner or internal pressure sheath having a reinforcement layer and a thermoplastic outer cover layer. In one or more embodiments, the thermoplastic may be high density polyethylene (HDPE). Thus, flexible pipe may include different layers that may be made of a variety of materials and may also provide corrosion resistance. For example, in one or more embodiments, pipe used to make up a coil of pipe may have a corrosion protection outer cover layer that is disposed over another layer of steel reinforcement. For example, helically wound steel strips may be placed over a liner made of thermoplastic pipe. Flexible pipe may be designed to handle a variety of pressures. Accordingly, flexible pipe may offer unique features and benefits versus steel/carbon steel pipe lines in the area of corrosion resistance, flexibility, installation speed and re-usability. Another type of flexible or spoolable pipe is coiled tubing or reeled tubing, which may be made of steel and have a corrosion protection shield layer.

Figure 2:
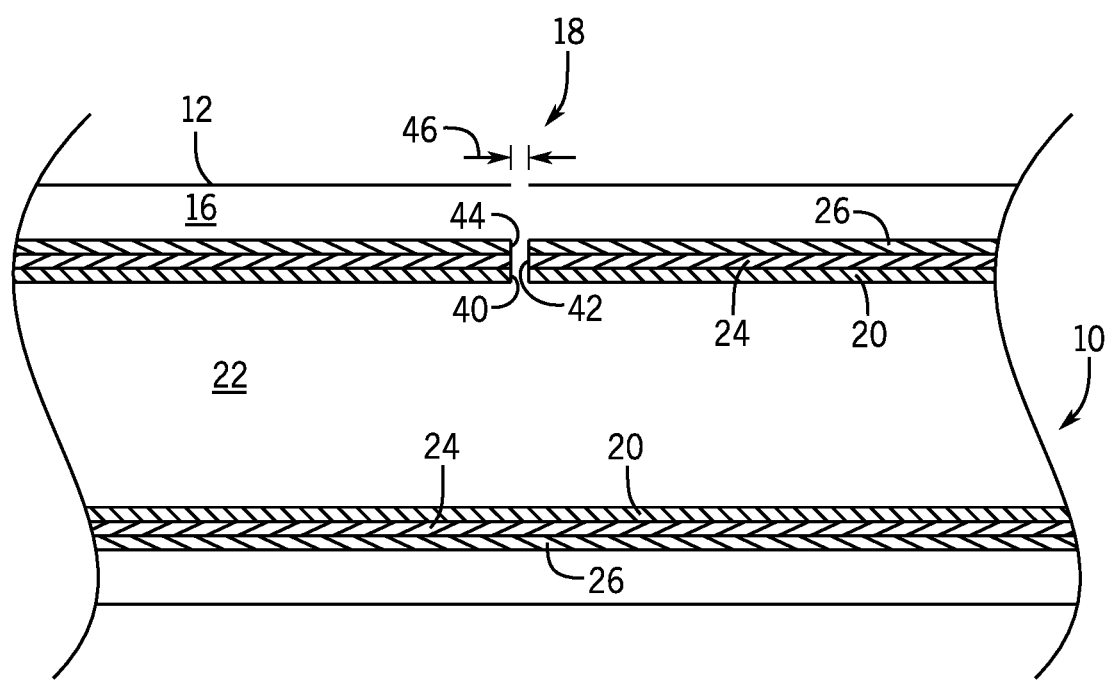
FIG. 2 is a cross-sectional side view of a flexible pipe within a carrier pipe with a hole drilled through the carrier pipe and the flexible pipe, according to embodiments of the present disclosure.

FIG. 2 is a cross-sectional side view of the flexible pipe 10 within the carrier pipe 12. The carrier pipe 12 is shown to include the aperture or hole 18 (e.g., radial hole) and the flexible pipe 10 includes holes 40, 42, and 44 within the respective layers 20, 24, and 26 (e.g., first layer, second layer, third layer). These holes 18, 40, 42, and 44 may be formed when a hole is drilled to the bore 22 of the flexible pipe 10. After the holes 18, 40, 42, and 44 are drilled through the carrier pipe 12 and the flexible pipe 10, the holes 18, 40, 42, and 44 may have a similar cross-sectional area or diameter 46. In order to block fluid flow from exiting the flexible pipe 10 through the holes 40, 42, and 44, the seal system described below places an expandable seal within the bore 22 around the hole 40 in the inner layer 20.

Figure 3:
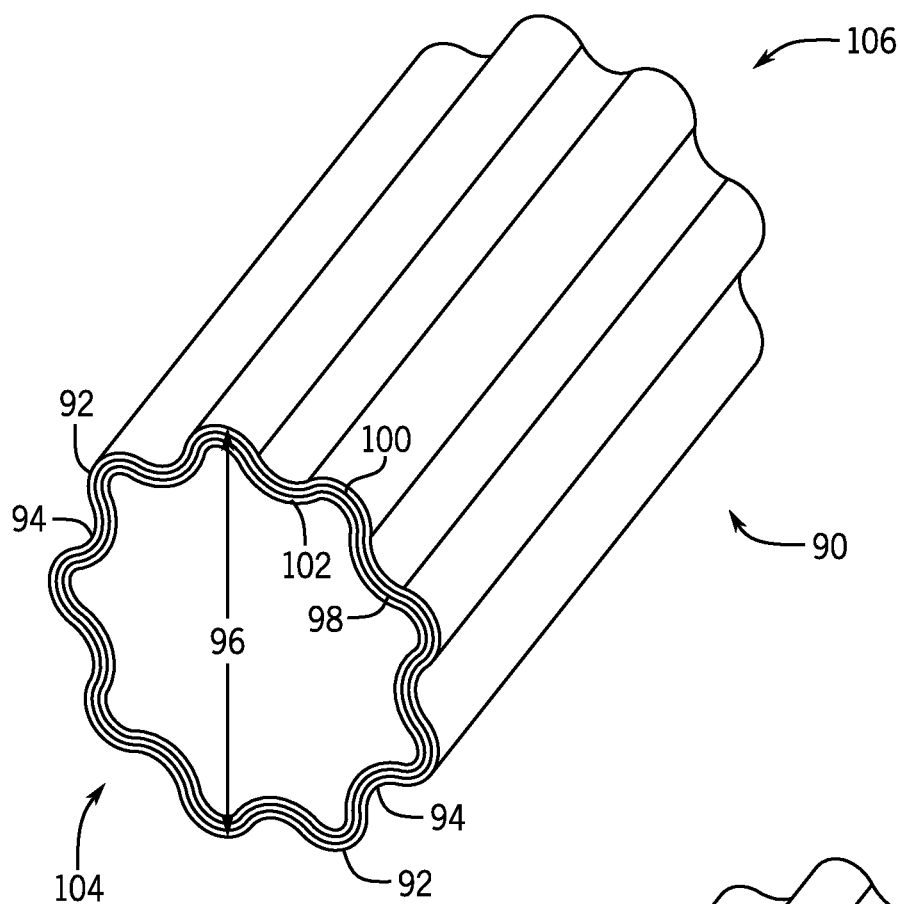
FIG. 3 is a perspective view of an expandable seal for sealing a hole in a flexible pipe, according to embodiments of the present disclosure.

FIG. 3 is a perspective view of an expandable seal 90 for sealing a hole in a flexible pipe (e.g., flexible pipe 10). As illustrated, the expandable seal 90 defines a corrugated (e.g., ridged, wavy) cross-sectional shape. For example, the expandable seal 90 may include a plurality of ridges 92 and recesses 94 that extend about the circumference of the expandable seal 90. This corrugated shape enables the expandable seal 90 to form an initial outermost diameter 96, in a contracted state, that can be expanded to a diameter that is greater than the initial outermost diameter 96, in an expanded state, which enables sealing. For example, the expandable seal 90 can be expanded from its initial corrugated shape into the shape of a conduit (e.g., flexible pipe 10) surrounding the expandable seal 90 (e.g., circular shape). As will be explained below, expanding the expandable seal 90 enables the expandable seal 90 to sealingly engage an interior surface of a conduit (e.g., inner layer 20 of the flexible pipe 10). The expandable seal 90 may therefore be placed proximate a hole (e.g., hole 40) within a conduit (e.g., flexible pipe 10) to enable sealing of the hole from within the conduit.

In some embodiments, the expandable seal 90 may include multiple layers of material (e.g., 1, 2, 3, 4, 5). These layers may differ in their properties but enable sealing. For example, the expandable seal 90 may include a first or structural layer 98 that provides strength and rigidity. In some embodiments, the structural layer 98 may be metal, which can be deformed from an initial shape while still providing strength and rigidity. A second or sealing layer 100 surrounds the structural layer 98. In operation, the sealing layer 100 forms a sealing engagement with the structural layer 98 and with a conduit (e.g., flexible pipe 10). The sealing layer 100 may be a rubber, plastic, or a combination thereof. In some embodiments, the sealing layer 100 may be a swellable material that swells in response to absorption of the fluid (e.g., fuel) flowing through the conduit (e.g., bore 22 of the flexible pipe 10). The swellable material may harden and/or increase the sealing engagement between the sealing layer 100 and the structural layer 98. In some embodiments, the expandable seal 90 may include a third or protective layer 102. The protective layer 102 may be an unreactive material (e.g., rubber, plastic) that blocks or reduces the structural layer 98 from reacting with fluid flowing through the conduit (e.g., flexible pipe 10). For example, the protective layer 102 and sealing layer 100 may block or reduce corrosion of the structural layer 98. In some embodiments, the sealing layer 100 and or the protective layer 102 may extend from a first end 104 to a second end 106 of the structural layer 98.

Figure 4:
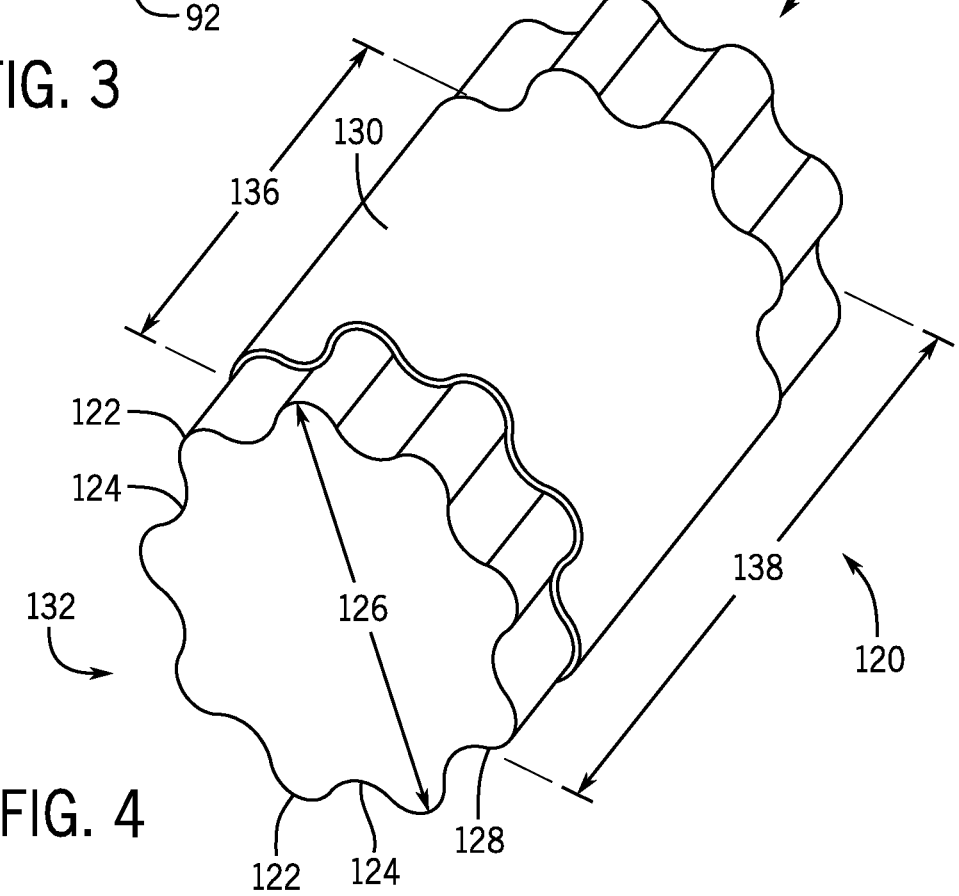
FIG. 4 is a perspective view of an expandable seal for sealing a hole in a flexible pipe, according to embodiments of the present disclosure.

FIG. 4 is a perspective view of an expandable seal 120 for sealing a hole in a flexible pipe (e.g., flexible pipe 10). As illustrated, the expandable seal 120 defines a corrugated (e.g., ridged, wavy) cross-sectional shape. For example, the expandable seal 120 may include a plurality of ridges 122 and recesses 124 that extend about the circumference of the expandable seal 120. This corrugated shape enables the expandable seal 120 to form an initial outermost diameter 126, in a contracted state, that can be expanded to a diameter that is greater than the initial outermost diameter 126, in an expanded state, which enables sealing. For example, the expandable seal 120 can be expanded from its initial corrugated shape into the shape of a conduit (e.g., flexible pipe 10) surrounding the expandable seal 120 (e.g., circular shape). After expansion, the expandable seal 120 can form a seal around a hole in the conduit.

In some embodiments, the expandable seal 120 may multiple layers of material (e.g., 1, 2, 3, 4, 5). These layers may differ in their properties but in operation facilitate sealing. For example, the expandable seal 120 may include a first or structural layer 128 that provides strength and rigidity. In some embodiments, the structural layer 128 may be metal. A second or sealing layer 130 surrounds the structural layer 128. In operation, the sealing layer 130 forms a sealing engagement with the structural layer 128 and with a conduit (e.g., flexible pipe 10). The sealing layer 130 may be a rubber, plastic, a swellable material, or a combination thereof. In some embodiments, the sealing layer 130 may not extend from a first end 132 to a second end 134 of the structural layer 130. In other words, the sealing layer 130 may extend a distance 136 over the structural layer 128 that is less than the full length 138 of the structural layer 128. In some embodiments, the expandable seal 120 may include only a single continuous portion of the material of the sealing layer 130 that extends over a portion of the structural layer 128. In other words, the expandable seal 120 may not include multiple sealing layers 130 that are laterally offset from each other along the length 138 of the structural layer 128.

Figure 5:
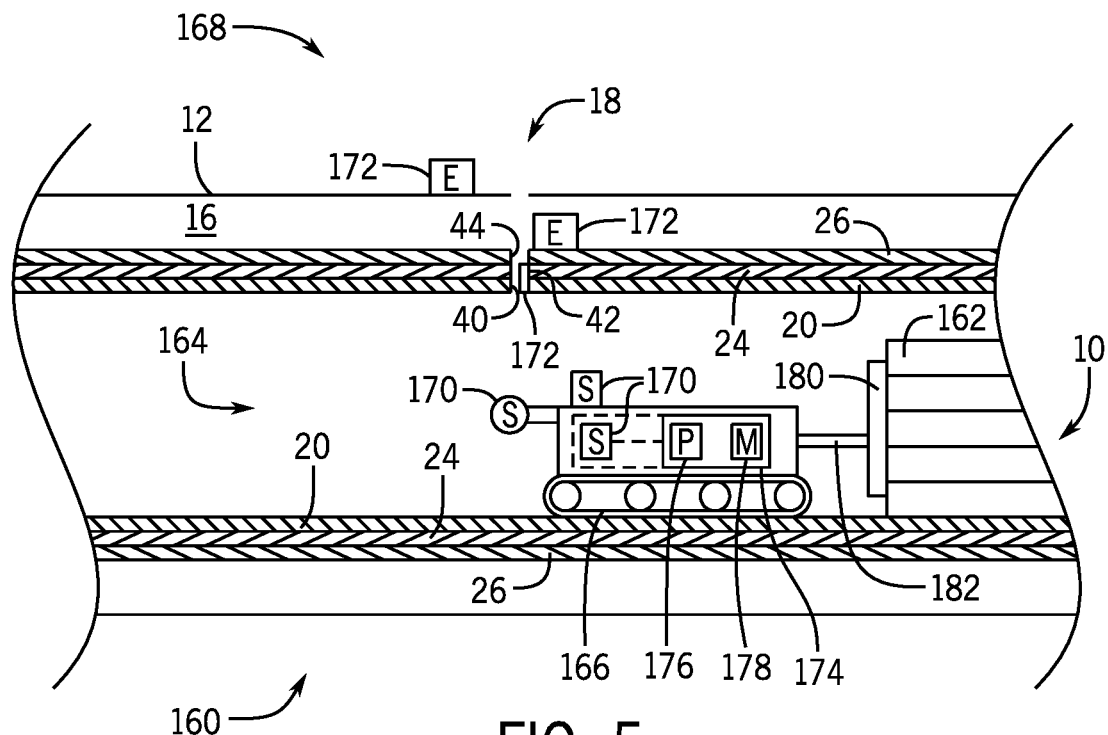
FIG. 5 is a partial cross-sectional side view of a seal system that includes a robot pulling an expandable seal into position to seal a hole in a flexible pipe, according to embodiments of the present disclosure.

FIG. 5 is a partial cross-sectional side view of a seal system 160 capable of delivering and expanding an expandable seal 162 (e.g., expandable seals 90, 120). In some embodiments, the seal system 160 may include a robot 164 that delivers the expandable seal 162 to a position aligned with the hole 40 (e.g., radial hole) in the inner layer 20 of the flexible pipe 10. The robot 164 is appropriately sized to fit within the bore 22 defined by the inner layer 20 of the flexible pipe 10 as well as to travel through connections between sections of flexible pipe 10 that define a diameter less than the inner layer 20. The robot 164 may include tracks 166 and/or wheels powered by a motor (not shown) that enables the robot 164 to move the expandable seal 162 through the flexible pipe 10.

To determine the appropriate location to deploy the expandable seal 162, the seal system 160 includes a location system 168. The location system 168 may include one or more sensors 170 and/or emitters 172 that enable the robot 164 to determine its location and/or the location of the expandable seal 162 relative to the hole 40 in the inner layer 20.

For example, after identifying the location of the hole 40 in the flexible pipe 10, an operator may install an emitter(s) 172 that emit a signal (e.g., electronic signal) that identifies the location of the hole 40. The emitters 172 may be coupled to the carrier pipe 12 (e.g., exterior or interior) and/or coupled to the flexible pipe 10 (e.g., exterior surface, inside holes 40, 42, and/or 44). The signal(s) from the emitter(s) 172 are sensed by a sensor(s) 170 (e.g., sensors on the robot 164). The emitters 172 may include a radio frequency identification device (RFID), light emitter (e.g., visible, infrared), radio wave emitter, microwave emitter, cellular signal emitter, among others. In some embodiments, there may be multiple emitters 172 that transmit different types of signals (e.g., light, electric) that are detected by different types of sensors 170 to provide redundancy and/or accuracy in locating the hole 40 and alignment of the expandable seal 162. The signals produced by these emitters 172 are received by the sensors 170 enabling a controller 174 to determine the position of the expandable seal 162 relative to the hole 40. In some embodiments, the sensors 170 may determine the position of the expandable seal 162 relative to the hole 40 using global positioning system (GPS) sensors, distance-traveled sensors (e.g., rotation sensors on robot 164), electromagnetic sensors (e.g., electromagnetic sensor that detects the absence of material from the second layer 24), cameras (e.g., visual, infrared), among others. In still other embodiments, the sealing system 160 may use a combination of the emitters 172 and sensors 170 to determine the location of the hole 40 as well as sensors 170 (e.g., camera, distance sensor, electromagnetic sensor) capable of detecting the position of the hole 40 without a signal from an emitter.

The controller 174 includes a processor 176 and a memory 178. The processor 176 may be a microprocessor that executes software for detecting the hole 40 and/or determining the location of the expandable seal 162 relative to the hole 40 using feedback from the sensors 170. The processor 176 may include one or multiple microprocessors, application specific integrated circuits (ASICs), field-programmable gate arrays (FPGAs), or some combination thereof. For example, the processor 176 may include one or more reduced instruction set computer (RISC) processors.

The memory 178 may include a volatile memory, such as random access memory (RAM), and/or a nonvolatile memory, such as read-only memory (ROM). The memory 178 may store a variety of information and may be used for various purposes. For example, the memory 178 may store processor executable instructions, such as firmware or software, for the processor 176 to execute. The memory 178 may include ROM, flash memory, a hard drive, or any other suitable optical, magnetic, or solid-state storage medium or a combination thereof. The memory 178 may store data, instructions, and any other suitable data.

To expand the expandable seal 162, the sealing system 160 includes an expander 180 (e.g., packer). The expander 180 couples to and rests within the expandable seal 162. In operation, the expander 180 swells to transition the expandable seal 162 from a contracted state to an expanded or sealing state. In some embodiments, the expander 180 couples to a robot 164 with a connector 182 that enables the robot 164 to pull the expander 180 and expandable seal 162 into position. In some embodiments, the connector 182 may enable both mechanical and electrical coupling between the robot 164 and the expander 180. While FIG. 5 illustrates the sealing system 160 with a robot 164 that pulls the expander 180 and the expandable seal 162, in other embodiments a wireline or pipeline inspection gauge (e.g., PIG) may pull and/or push the expander 180 and expandable seal 162 into position. In some embodiments, the PIG may be a smart PIG that includes various sensors for detecting its position and/or the position of the expandable seal 162 relative to the hole 40.

Figure 6:
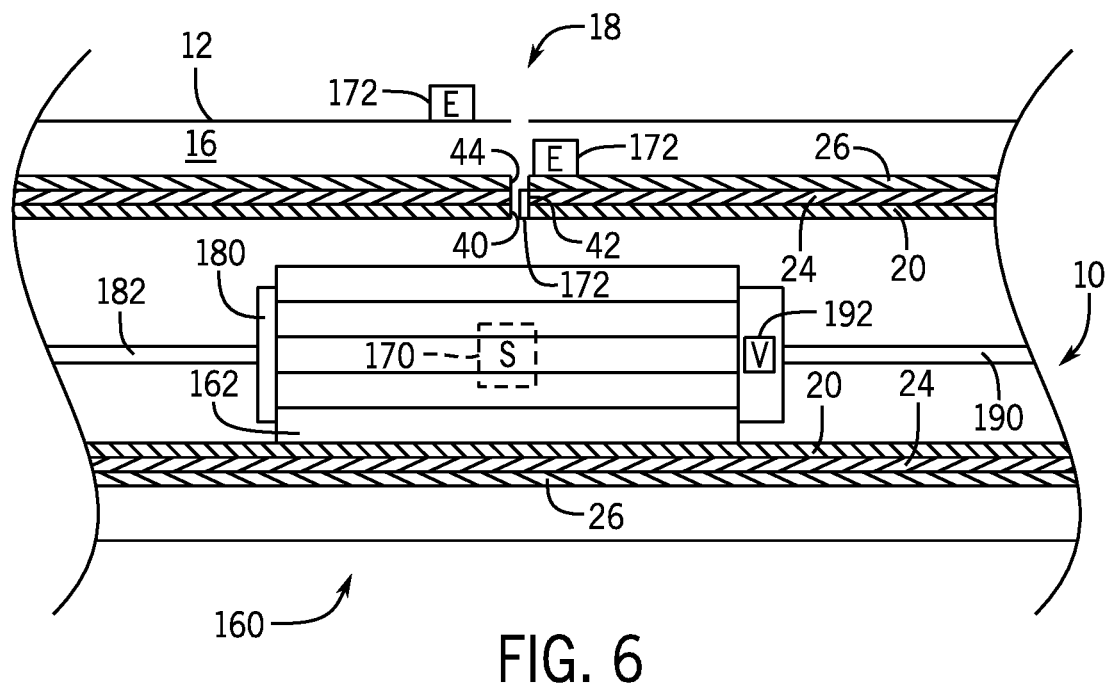
FIG. 6 is a partial cross-sectional side view of the seal system of FIG. 5 with the expandable seal aligned with the hole in the flexible pipe, according to embodiments of the present disclosure.

FIG. 6 is a partial cross-sectional side view of the seal system 160 of FIG. 5 with the expandable seal 162 aligned with the hole 40 in the flexible pipe 10. Using the sensors 170 and/or emitters 172, the seal system 160 positions the expandable seal 162 relative to the hole 40. Once in position, the expander 180 expands, which in turn expands the expandable seal 162. In some embodiments, the expander 180 expands in response to receiving fluid (e.g., gas, liquid, or a combination thereof) through a conduit 190. The conduit 190 may couple to a pump(s) that pumps a fluid from a fluid source. For example, the pump and/or fluid source may be positioned outside of the carrier pipe 12. The fluid flow into the expander 180 may be controlled by controlling the pump and/or by controlling a valve 192 coupled to the expander 180. The valve 192 may be controlled by the controller 174 through the connector 182. In some embodiments, the seal system 160 may include one or more of the sensors 170 to facilitate positioning of the expandable seal 162 relative to the hole 40. For example, the sensors 170 coupled to the robot 164 may enable identification of the hole 40 while the sensor(s) 170 coupled to the expander 180 enables alignment of the expandable seal 162 with the hole 40.

Figure 7:
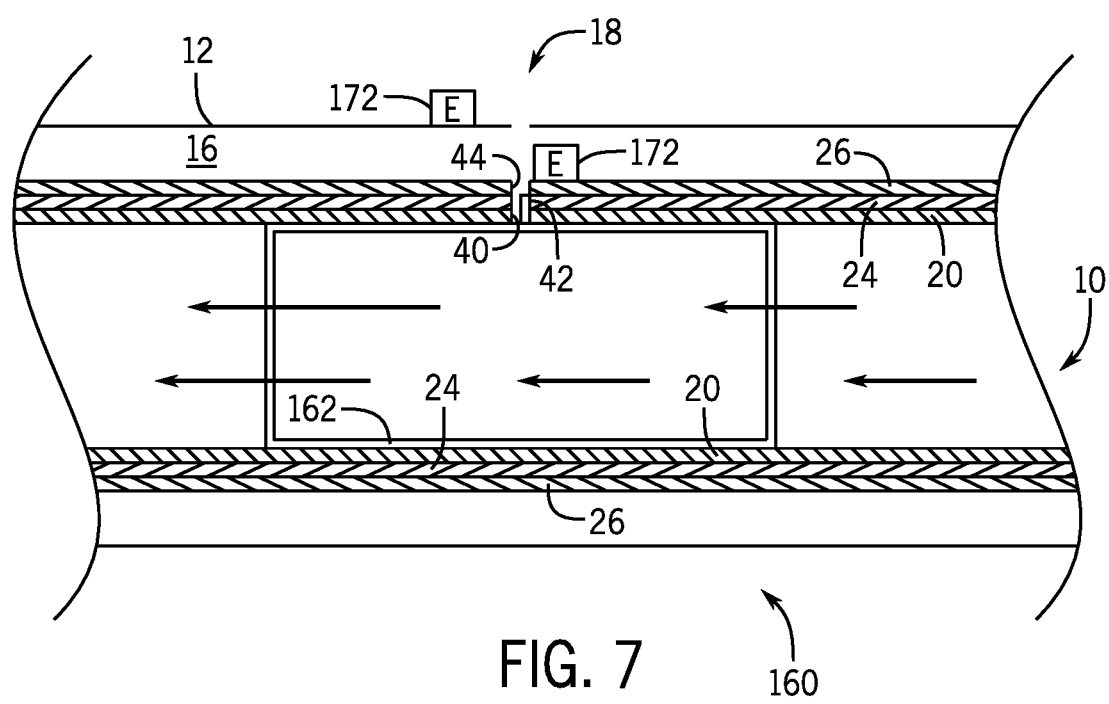
FIG. 7 is a partial cross-sectional side view of the seal system of FIG. 6 with the expandable seal sealing the hole in the flexible pipe, according to embodiments of the present disclosure.

FIG. 7 is a partial cross-sectional side view of the seal system of FIG. 6 with the expandable seal 162 in an expanded state sealing the hole 40 in the flexible pipe 10. After expansion of the expandable seal 162, the expander 180 is withdrawn and the flexible pipe 10 may return to operation.

FIG. 8 is a side view of a seal system 200. The seal system 200 may include a robot 202 capable of delivering a plurality of expandable seals 204 to respective holes in a conduit (e.g., flexible pipe 10). It should be understood that the seal system 200 may be moved or delivered with a wireline or PIG as well. Once in position, the expandable seals 204 are expanded with respective expanders 206 (e.g., packers) that couple to the expandable seals 204. While two expandable seals 204 and the associated expanders 206 are illustrated, the seal system 200 may include additional or a different number of expandable seals 204 and expanders 206 (e.g., 1, 2, 3, 4, 5, or more). By including additional expandable seals 204, the seal system 200 may repair a plurality of holes in a conduit (e.g., sequentially). The seal system 200 may also include a fluid source 208 (e.g., container with a fluid) and a pump 210 that pressurizes a fluid to expand the expanders 206, which in turn expand the expandable seals 204. The pump 210 couples to the expanders 206 with a connector 212. The connectors 212 may enable both fluid communication from the pump 210 and electronic communication from a controller 214 for controlling the valves 216. The valves 216 may be multiway valves that enable pressurized fluid from the pump 210 to expand specific expanders 206 and bypassing other expanders 206. In this way, specific expandable seals 204 may be expanded at desired locations along the conduit. The pump 210 and valves 216 are controlled with the controller 214 in response to positioning feedback from sensors 218. As explained above, sensors such as sensors 218 may be used to determine the location of the expandable seals 204 relative to holes along a conduit enabling proper alignment and deployment of the expandable seals 204. To facilitate movement of the seal system 200 through the conduit, the fluid source 208, pump 210, and expanders 206 may couple to platforms 220 supported by one or more wheels 222. In some embodiments, the wheels 222 may couple directly to the fluid source 208, the pump 210, and/or the expanders 206.

FIG. 9 is a side view of a seal system 240. The seal system 240 may include a robot 242 capable of delivering a plurality of expandable seals 244 to respective holes in a conduit (e.g., flexible pipe 10). It should be understood that the seal system 240 may be moved or delivered with a wireline or PIG as well. Once in position, the expandable seals 244 are expanded with respective expanders 246 (e.g., packers) that couple to the expandable seals 244. While two expandable seals 244 and the associated expanders 246 are illustrated, the seal system 240 may include additional or a different number of expandable seals 244 and expanders 246 (e.g., 1, 2, 3, 4, 5, or more). In this way, the seal system 240 may be deployed to sequentially repair a plurality of holes in a conduit. The seal system 240 actuates the expanders 246 with a pressurized fluid (e.g., liquid, gas) through a conduit 248 that couples a pressurized fluid source. To control which of expandable seals 244 expands, the expanders 246 include valves 250. The valves 250 may be multiway valves that enable pressurized fluid from the pump 210 to expand specific expanders 246 and bypass other expanders 246. In this way, specific expandable seals 244 may be expanded at desired locations along the conduit. The valves 250 may be controlled with a controller 252 in response to positioning feedback from sensors 254 that indicates a desired expander 246 is in proper position for deployment. To facilitate movement of the seal system 240 through the conduit, the expanders 246 may couple to platforms 256 supported by one or more wheels 258. In some embodiments, the wheels 222 may couple directly to the expanders 246.

Figure 10:
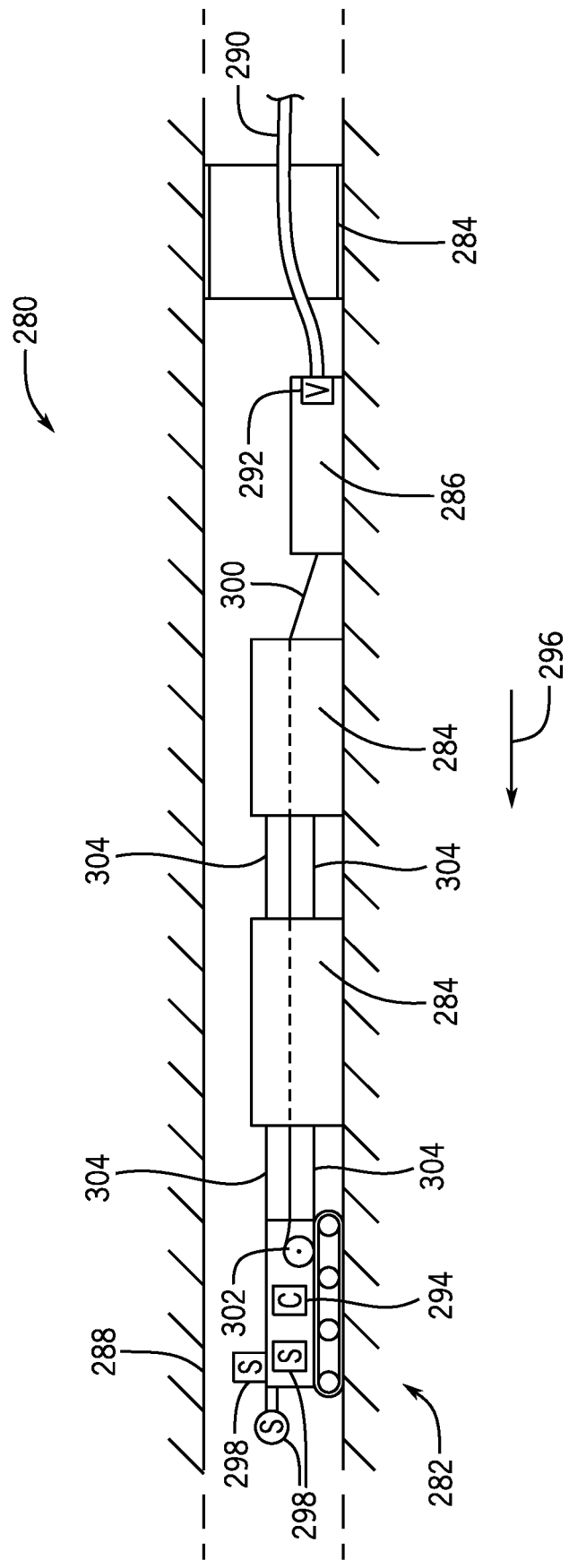
FIG. 10 is a side view of a seal system, according to embodiments of the present disclosure.

FIG. 10 is a side view of a seal system 280. The seal system 280 may include a robot 282 capable of delivering a plurality of expandable seals 284 to respective holes in a conduit (e.g., flexible pipe 10). It should be understood that the seal system 280 may be moved or delivered with a wireline or PIG as well. Once in position, the expandable seals 284 are expanded with an expander 286 (e.g., packer) that sequentially couples to the expandable seals 284. While three expandable seals 284 are illustrated, the seal system 280 may include additional or a different number of expandable seals 284 (e.g., 1, 2, 3, 4, 5, or more). In this way, the seal system 280 may be deployed to sequentially repair a plurality of holes in a conduit 288 (e.g., flexible pipe 10). The seal system 280 actuates the expander 286 with a pressurized fluid (e.g., liquid, gas) through a conduit 290 that couples a pressurized fluid source to the expander 286. The flow of fluid to the expander 286 may be controlled with a valve 292 and/or with a valve coupled to the fluid source. In some embodiments, the controller 294 may control operation of the valve 292.

As illustrated, the seal system 280 may include a single expander 286 for expanding the expandable seals 284. For example, the expander 286 may sequentially expand the expandable seals 284 starting with the last expandable seal 284 of the seal system 280, relative to the direction of travel 296. In operation, the seal system 280 uses feedback from sensors 298 to determine the location of holes in the conduit 288. Once identified, the seal system 280 moves an expandable seal 284 into position relative to the hole. The expander 286 is then expanded to expand the expandable seal 284 over the hole. The expander 286 may then contract or deflate enabling separation of the expander 286 from the expandable seal 284. To reuse the expander 286 for expanding other expandable seals 284, the expander 286 is drawn in direction 296 with a cable or connector 300. For example, the robot 282 may include a spool 302 driven by a motor that takes up the cable or connector 300 enabling the seal system 280 to move the expander 286 into the next expandable seal 284. The process may then repeat itself with the robot 282 placing the next expandable seal 284 in position relative to another hole in the conduit 288. The expander 286 is then again expanded to expand the expandable seal 284 into position. In order to couple the series of expandable seals 284 to each other and to the robot 282, the expandable seals 284 may be coupled together with breakable or temporary connectors 304 (e.g., plastic connectors). In operation, as the expandable seal 284 expands, the connectors 304 of the expanding expandable seal 284 break from the neighboring expandable seal 284. Once broken, the remaining expandable seals 284 separate from the recently expanded expandable seal 284, which enables the robot 282 to move to the next hole in the conduit. This process is then repeated until all of the expandable seals 284 have been used or no holes are left to seal.

Figure 11:
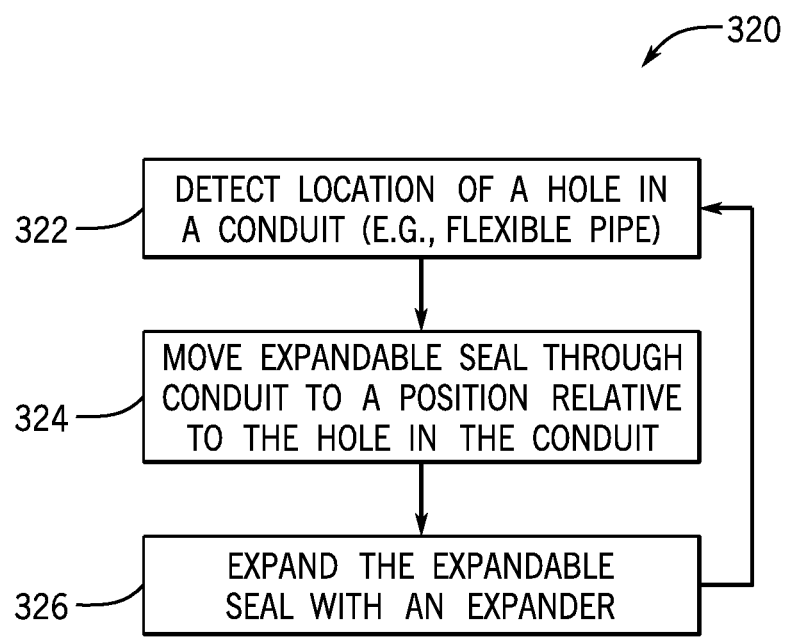
FIG. 11 is a flowchart of a method for sealing a hole in a flexible pipe with a seal system, according to embodiments of the present disclosure.

FIG. 11 is a flowchart of a method 320 for sealing a hole in a flexible pipe with a seal system. The method 320 begins by detecting a location of a hole in a conduit (e.g., flexible pipe 10). The hole is detected using feedback from one or more sensors of the seal system, step 322. For example, emitters may be placed by an operator proximate the hole which enables sensors to detect the location of the hole relative to the expandable seal. The expandable seal is then moved into position relative to the hole, step 324. The seal system then expands the expandable seal with an expander to seal the hole, step 326. After sealing the hole, the method 320 may then return to step 322 and repeat the process for additional holes in the conduit. Although the flowchart illustrates the steps in a certain sequence, it should be understood that the steps may be performed in any suitable order and certain steps may be carried out simultaneously, where appropriate. Additionally, steps may be added to or omitted from the method 320. For example, the method 320 may include additional steps as described above in the description of FIGS. 2-10.

Technical effects of the invention include the ability to seal holes in a flexible pipe from within the flexible pipe. Another effect is the ability to seal a hole in a flexible pipe positioned within a carrier pipe.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A seal system for sealing a hole in a flexible pipe, comprising:
   an expandable seal configured to be inserted into a bore of the flexible pipe while in a contracted state;
   a fluid source positioned outside of the flexible pipe; and
   an expander configured to be inserted into the expandable seal and fluidly connected to the fluid source, wherein the fluid source is configured to supply from fluid from outside the flexible pipe to the expander to enable the expander to transition the expandable seal from the contracted state to an expanded state such that an exterior surface of the expandable seal engages an interior surface of the flexible pipe around the hole in the flexible pipe to facilitate sealing the hole.

2. The seal system of claim 1, wherein the expandable seal comprises:
   a structural layer, wherein the structural layer comprises metal and is configured to provide strength and rigidity to the expandable seal;
   a sealing layer surrounding the structural layer of material, and wherein the sealing layer comprises rubber, plastic, or both and is configured to engage the interior surface of the flexible pipe while the expandable seal is in the expanded state to facilitate sealing the hole in the flexible pipe; and
   a protective layer under the structural layer, wherein the protective layer comprises unreactive material and is configured to facilitate blocking fluid within the bore of the flexible pipe from contacting the structural layer of the expandable seal.

3. The seal system of claim 2, wherein the unreactive material in the protective layer of the expandable seal comprises unreactive rubber, unreactive plastic, or both.

4. The seal system of claim 2, wherein axial length of the sealing layer in the expandable seal is shorter than axial length of the structural layer in the expandable seal.

5. The seal system of claim 1, wherein the expandable seal comprises a plurality of ridges and a plurality of recesses that extend about a circumference of the expandable seal while the expandable seal is in the contracted state.

6. The seal system of claim 1, wherein the expandable seal comprises:
a corrugated cross-sectional shape while in the contracted state; and
a cylindrical cross-sectional shape while in the expanded state.

7. The seal system of claim 1, comprising:
a robot; and
a connector configured to connect the robot to the expander to enable the connector to move the expander, the expandable seal, or both within the bore of the flexible pipe.

8. The seal system of claim 7, wherein the robot comprises:
wheels; and
a motor connected to the wheels to enable the robot to move within the bore of the flexible pipe.

9. The seal system of claim 7, wherein the robot comprises:
a sensor configured to generate sensor data based at least in part on an electromagnetic signal received by the sensor; and
a controller communicatively coupled to the sensor, wherein the controller is configured to determine location of the hole in the flexible pipe, location of the expandable seal within the bore of the flexible pipe, or both based at least in part on the sensor data.

10. The seal system of claim 7, comprising an emitter configured to be positioned proximate to the hole in the flexible pipe and to emit an electromagnetic signal, wherein the robot comprises a sensor configured to generate sensor data based on the electromagnetic signal emitted by the emitter to enable the robot to determine location of the hole in the flexible pipe, location of the expandable seal within the bore of the flexible pipe, or both based at least in part on the sensor data.

11. A method of repairing a hole in a flexible pipe, comprising:
inserting an expander into an expandable seal;
fluidly connecting a fluid source positioned outside the flexible pipe to the expander;
moving the expandable seal within a bore of the flexible pipe to align the expandable seal with the hole in the flexible pipe while the expandable seal is in a contracted state; and
expanding the expandable seal from the contracted state to an expanded state using the expander at least in part by supplying fluid from the fluid source positioned outside the flexible pipe to the expander to facilitate sealing the hole in the flexible pipe.

12. The method of claim 11, wherein fluidly connecting the fluid source to the expander comprises fluidly connecting a conduit between the fluid source and the expander.

13. The method of claim 11, comprising:
emitting, using an emitter positioned proximate to the hole in the flexible pipe, an electromagnetic signal;
securing a robot to the expander, wherein the robot comprises a sensor and a controller communicatively coupled to the sensor;
generating, using the sensor of the robot, sensor data based at least in part on the electromagnetic signal emitted from the emitter; and
determining, using the controller of the robot, location of the expandable seal relative to the hole in the flexible pipe based at least in part on the sensor data.

14. The method of claim 11, comprising securing a robot to the expander, wherein:
the robot comprises wheels and a motor connected to the wheel; and
moving the expandable seal within the bore of the flexible pipe comprises actuating the wheels of the robot via the motor to pull the expander and the expandable seal within the bore of the flexible pipe.

15. A seal system for a sealing a hole in a conduit, comprising an expandable seal, wherein:
the seal system is configured to:
maintain the expandable seal in a contracted state to facilitate moving the expandable seal within a bore of the conduit such that the expandable seal is aligned with the hole in the conduit; and
transition the expandable seal from the contracted state to an expanded state such that the expandable seal contacts an interior surface of the conduit around the hole to facilitate sealing the hole in the conduit; and
the expandable seal comprises:
a structural layer, wherein the structural layer comprises metal and is configured to provide strength and rigidity to the expandable seal;
a sealing layer surrounding the structural layer, wherein the sealing layer comprises rubber, plastic, or both and is configured to contact the interior surface of the conduit around the hole while the expandable seal is in the expanded state to facilitate sealing the hole in the conduit; and
a protective layer under the structural layer, wherein the protective layer comprises unreactive material and is configured to facilitate blocking fluid within the bore of the conduit from contacting the structural layer of the expandable seal.

16. The seal system of claim 15, wherein the unreactive material in the protective layer of the seal comprises unreactive plastic, unreactive rubber, or both.

17. The seal system of claim 15, wherein axial length of the sealing layer in the seal is shorter than axial length of the structural layer in the expandable seal.

18. The seal system of claim 15, comprising:
an emitter configured to be disposed proximate to the hole in the conduit and to emit an electromagnetic signal; and
a robot configured to be secured to an expander that is disposed within the expandable seal to enable the robot to pull the expandable seal within the bore of the conduit, wherein the robot comprises:
a sensor configured to generate sensor data based at least in part on the electromagnetic signal emitted from the emitter; and
a controller communicatively coupled to the sensor, wherein the controller is configured to determine location of the expandable seal relative to the hole in the conduit based at least in part on the sensor data.

19. The seal system of claim 15, comprising a robot configured to be secured to an expander disposed within the seal, wherein the robot comprises:
wheels; and
a motor connected to the wheels, wherein the robot is configured to move the expander and the expandable seal within the bore of the conduit at least in part by actuating the wheels via the motor.

* * * * *